(12) United States Patent
Zhang et al.

(10) Patent No.: US 10,139,984 B2
(45) Date of Patent: Nov. 27, 2018

(54) DEVICES, STORAGE MEDIUM, AND METHODS FOR MULTIMEDIA PROCESSING

(71) Applicant: TENCENT TECHNOLOGY (SHENZHEN) COMPANY LIMITED, Shenzhen (CN)

(72) Inventors: Zhenwei Zhang, Shenzhen (CN); Ling Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 206 days.

(21) Appl. No.: 15/136,216

(22) Filed: Apr. 22, 2016

(65) Prior Publication Data

US 2016/0239158 A1  Aug. 18, 2016

Related U.S. Application Data

(63) Continuation of application No. PCT/CN2014/088633, filed on Oct. 15, 2014.

(30) Foreign Application Priority Data

Oct. 22, 2013 (CN) .......................... 2013 1 0499055

(51) Int. Cl.

| | |
|---|---|
| G06F 3/0481 | (2013.01) |
| H04N 21/422 | (2011.01) |
| H04N 21/43 | (2011.01) |
| H04N 21/81 | (2011.01) |

(Continued)

(52) U.S. Cl.
CPC ............ G06F 3/0481 (2013.01); G06F 3/017 (2013.01); G06F 3/04845 (2013.01);
(Continued)

(58) Field of Classification Search
CPC ...................................................... H04L 65/00
See application file for complete search history.

(56) References Cited

U.S. PATENT DOCUMENTS

2002/0197067 A1* 12/2002 Ohnishi ............... G11B 27/105
386/230
2003/0103234 A1*  6/2003 Takabayashi ...... H04N 1/00132
358/1.15
(Continued)

FOREIGN PATENT DOCUMENTS

CN        1503159 A      6/2004
CN      101976191 A      2/2011
(Continued)

OTHER PUBLICATIONS

The World Intellectual Property Organization (WIPO) International Search Report for PCT/CN2014/088633 dated Jan. 21, 2015.
(Continued)

*Primary Examiner* — Josnel Jeudy
(74) *Attorney, Agent, or Firm* — Anova Law Group, PLLC

(57) ABSTRACT

Devices, methods, and a storage medium are provided for multimedia processing. For example, multimedia information to be processed and configuration information of the multimedia information are acquired. The configuration information includes one or more special effect processing conditions. An attribute status of the multimedia information is acquired; and when the attribute status of the multimedia information matching with the special effect processing conditions, special effect processing is performed on the multimedia information.

20 Claims, 11 Drawing Sheets

(51) Int. Cl.
    *H04N 21/84* (2011.01)
    *G06F 3/01* (2006.01)
    *G06F 3/0484* (2013.01)
    *G06F 3/0488* (2013.01)
    *G06F 21/31* (2013.01)
    *G06T 5/00* (2006.01)
    *G06T 11/00* (2006.01)
    *H04L 12/58* (2006.01)
    *H04L 29/06* (2006.01)
    *G06F 3/00* (2006.01)

(52) U.S. Cl.
    CPC .......... *G06F 3/04883* (2013.01); *G06F 21/31* (2013.01); *G06T 5/002* (2013.01); *G06T 5/003* (2013.01); *G06T 11/001* (2013.01); *H04L 51/046* (2013.01); *H04L 65/60* (2013.01); *H04N 21/42202* (2013.01); *H04N 21/42224* (2013.01); *H04N 21/4307* (2013.01); *H04N 21/8186* (2013.01); *H04N 21/84* (2013.01); *G06T 2200/24* (2013.01)

(56) References Cited

U.S. PATENT DOCUMENTS

2011/0219229 A1* 9/2011 Cholas .................. G06F 21/00
                                                            713/168
2013/0262634 A1* 10/2013 Chang .............. H04N 21/25891
                                                            709/219

FOREIGN PATENT DOCUMENTS

| CN | 102411478 A | 4/2012 |
| CN | 102970364 A | 3/2013 |
| TW | 201340694 A | 10/2013 |

OTHER PUBLICATIONS

The State Intellectual Property Office of the People's Republic of China (SIPO) Office Action 1 for 2013104990551 Aug. 2, 2018 7 pages (including translation).

* cited by examiner

DEVICES, STORAGE MEDIUM, AND METHODS FOR MULTIMEDIA PROCESSING

CROSS-REFERENCES TO RELATED APPLICATIONS

The application is a continuation of PCT Application No. PCT/CN2014/088633, filed on Oct. 15, 2014, which claims priority to Chinese Patent Application No. 201310499055.7, filed Oct. 22, 2013, the entire content of all of which is incorporated by reference herein.

FIELD OF THE TECHNOLOGY

This application generally relates to the field of computer technologies, and, more particularly, relates to devices, terminals, storage medium, and methods for multimedia process.

BACKGROUND OF THE INVENTION

With development of the Internet technology, multimedia information (e.g., pictures, animations, videos, etc.) is widely applied. For example, a user can release multimedia information on a social network site for information interaction with other users. To enhance the beautification effects of the multimedia information and satisfy individual requirements of the user on the multimedia information, the user often uses a professional multimedia processing tool (e.g., Photoshop) to perform special effect processing on the multimedia information, including fuzzification processing, toning processing, etc. A multimedia processing tool, however, often only processes the multimedia information according to user operations and cannot automatically perform special effect processing on the multimedia information according to an actual attribute status of the multimedia information (e.g., temperature and humidity of an environment associated with the multimedia information), or other status information of the multimedia information (e.g., a current position), which results in limited flexibility and limited intelligence of multimedia processing.

Hence it is highly desirable to improve the techniques for multimedia processing.

BRIEF SUMMARY OF THE INVENTION

According to one embodiment, a method is provided for multimedia processing. For example, multimedia information to be processed and configuration information of the multimedia information are acquired. The configuration information includes one or more special effect processing conditions; an attribute status of the multimedia information is acquired; and when the attribute status of the multimedia information matching with the one or more special effect processing conditions, special effect processing is performed on the multimedia information.

According to another embodiment, a multimedia processing device includes: an information acquisition module configured to acquire multimedia information to be processed and configuration information of the multimedia information. The configuration information includes one or more special effect processing conditions. A status acquisition module is configured to acquire an attribute status of the multimedia information; and a special effect processing module is configured to, in response to or when the attribute status of the multimedia information matching with the special effect processing conditions, perform special effect processing on the multimedia information.

According to yet another embodiment, a terminal includes a multimedia processing device that includes: an information acquisition module configured to acquire multimedia information to be processed and configuration information of the multimedia information. The configuration information includes one or more special effect processing conditions. A status acquisition module is configured to acquire an attribute status of the multimedia information; and a special effect processing module is configured, when the attribute status of the multimedia information matching with the special effect processing conditions, to perform special effect processing on the multimedia information.

According to yet another embodiment, a non-transitory computer readable storage medium includes programming instructions for multimedia processing. The programming instructions are configured to cause one or more data processors to execute certain operations. For example, multimedia information to be processed and configuration information of the multimedia information are acquired. The configuration information includes one or more special effect processing conditions. An attribute status of the multimedia information is acquired; and when the attribute status of the multimedia information matching with the one or more special effect processing conditions, special effect processing is performed on the multimedia information.

For example, the devices, storage medium, and methods described herein are configured to perform special effect processing automatically on multimedia information if an attribute status of multimedia information matches with one or more special effect processing conditions, so as to achieve flexibility of special effect processing on the multimedia information (e.g., timing, methods, etc.) in order to better meet actual user needs and improve intelligence of multimedia processing.

One or more exemplary benefits may be achieved. These benefits and various additional objects, features and advantages of the present invention can be fully appreciated with reference to the detailed description and accompanying drawings that follow.

DETAILED DESCRIPTION OF THE INVENTION

Certain embodiments of the present invention are directed to computer technology and to solve technical problems for computer technology, terminal device technology, server technology, wireless technology, etc. More particularly, some embodiments of the invention provide devices and methods for data processing. Merely by way of example, some embodiments of the invention have been applied to media data processing. But it would be recognized that the invention has a much broader range of applicability.

Figure 1:
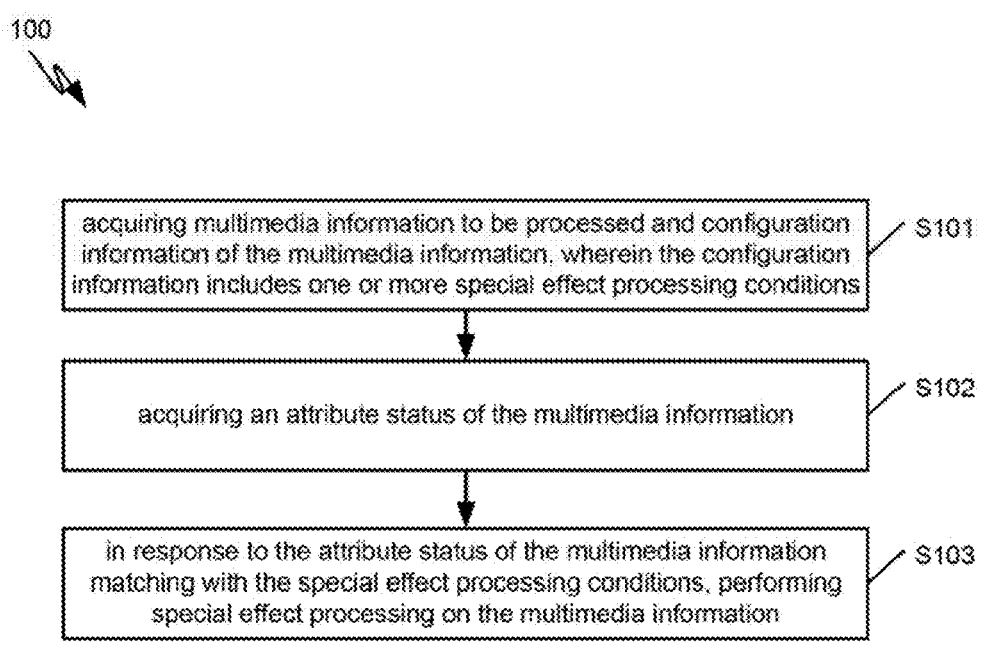
FIG. 1 is a simplified diagram showing a method for multimedia processing according to one embodiment of the present invention.

FIG. 1 is a simplified diagram showing a method for multimedia processing according to one embodiment of the present invention. The diagram is merely an example, which should not unduly limit the scope of the claims. One of ordinary skill in the art would recognize any variations, alternatives, and modifications. The method 100 includes, for example, processes S101-S103.

According to one embodiment, the process S101 includes: acquiring multimedia information to be processed and configuration information of the multimedia information, and the configuration information includes one or more special effect processing conditions. For example, the multimedia information to be processed and the configuration information of the multimedia information can be acquired via an instant messaging application. As an example, the multimedia information to be processed and the configuration information of the multimedia information which are transmitted by instant messaging friend users are acquired via the instant messaging application. In another example, the multimedia information to be processed and the configuration information of the multimedia information can also be acquired via an SNS (Social Networking Services) application. For instance, the multimedia information to be processed and the configuration information of the multimedia information which are released by SNS friend users are acquired via the SNS application. In yet another example, the multimedia information to be processed and the configuration information of the multimedia information can also be acquired via a cloud server. For instance, the cloud server can store the multimedia information to be processed and the configuration information of the multimedia information, and the multimedia information to be processed and the configuration information of the multimedia information can be downloaded from the cloud server.

According to some embodiments, the multimedia information can include pictorial information, animation information and video information. In some embodiments, the multimedia information to be processed does not include special effects. That is, the multimedia information is not subjected to special effect processing. As an example, the multimedia information includes a background layer which records media content of the multimedia information. In certain embodiments, the multimedia information to be processed includes special effects. That is, the multimedia information is not subjected to special effect processing. As an example, the multimedia information includes a background layer and a special effect layer. The background layer records media content of the multimedia information and the special effect layer records special effect content of the multimedia information.

According to certain embodiments, the special effect processing conditions include: special effect processing time, a special effect processing environment, a special effect processing position, a special effect processing operation, etc. For example, the special effect processing time is represented by a time value and is also represented by a timestamp. As an example, the special effect processing environment includes: special effect processing temperature, special effect processing humidity, special effect processing light ray, etc. As another example, the special effect processing operation includes: a touch operation, a mid-air gesture operation, a radio wave control operation, etc.

According to another embodiment, the process S102 includes: acquiring an attribute status of the multimedia information. For example, the attribute status includes: a time status, an environmental status, a position status, an operation status, etc. According to some embodiments, an acquisition process of the time status of the multimedia information includes: acquiring current time information. For example, the current time information corresponds to a time of a system associated with the multimedia information. As an example, the current time information is represented by a time value, such as 14:00:00, Feb. 4, 2013. As another example, the current time information is represented by a timestamp, such as 1359957600. According to certain embodiments, the acquisition process of the time status of the multimedia information further includes: determining the current time information as the time status of the multimedia information.

According to some embodiments, an acquisition process of the environmental status of the multimedia information includes: detecting current environmental information associated with the multimedia information. The current environmental information includes: temperature information, humidity information, light ray information, etc. For example, the environmental information is detected through calling an environmental sensor which includes a temperature sensor, a humidity sensor, a light ray sensor, etc. According to certain embodiments, the acquisition process of the environmental status of the multimedia information further includes: determining the current environmental information as the environmental status of the multimedia information.

According to some embodiments, an acquisition process of the position status of the multimedia information includes: acquiring current position information of the multimedia information. For example, the current position information of the multimedia information is acquired based on an LBS (Location Based Services) technology. As an example, the current position information is represented by longitude and latitude coordinates. As another example, LBS is provided based on geographical position information which is acquired through a wireless communication network (e.g., a GSM (Global System for Mobile communications) network and a CDMA (Code Division Multiple Access) network), or via a positioning technology such as a GPS (Global Positioning System). According to certain embodiments, the acquisition process of the position status of the multimedia information further includes: determining the current position information of the multimedia information as the position status of the multimedia information.

According to some embodiments, an acquisition process of the operation status of the multimedia information includes: detecting operation information associated with the multimedia information. The operation information includes: a touch operation, a mid-air gesture operation, a radio wave control operation, etc. For example, the operation information acting on the multimedia information can be detected by calling a motion sensor which includes a speed sensor, an acceleration sensor, a gyroscope, a mid-air gesture sensor, a muscle wave sensor etc. According to certain embodiments, the acquisition process of the operation status of the multimedia information further includes: determining the operation information associated with the multimedia information as the operation status of the multimedia information.

According to yet another embodiment, the process S103 includes: when the attribute status of the multimedia information matching with the special effect processing conditions, performing special effect processing on the multimedia information. For example, the matching of the attribute status of the multimedia information and the special effect processing conditions can include one or more of the following: (1) The time status of the multimedia information reaches the special effect processing time. That is, the current time information reaches the special effect processing time. (2) The environmental status of the multimedia information satisfies the special effect processing environment. For example, the temperature of the environment where the multimedia information is located reaches the special effect processing temperature; the humidity of the environment where the multimedia information is located reaches the special effect processing humidity; and/or the light ray of the environment where the multimedia information is located reaches the special effect processing light ray. (3) The position status of the multimedia information is the same as the special effect processing position. That is, the current position information of the multimedia information is the same as the special effect processing position. (4) The operation status of the multimedia information is the same as the special effect processing operation. For example, a touch operation acting on the multimedia information is consistent with the touch operation specified by the special effect processing operation; a mid-air gesture operation acting on the multimedia information is consistent with the mid-air gesture operation specified by the special effect processing operation; and/or a radio wave control operation acting on the multimedia information is consistent with the radio wave control operation specified by the special effect processing operation.

According to certain embodiments, the special effect processing can include: fuzzification processing, fuzzification reduction processing, toning processing, tone reduction processing, liquefaction processing, liquefaction reduction processing, etc. For example, the special effect processing for the multimedia information includes: a process for adding special effect content to the multimedia information, a process for modifying special effect content of the multimedia information, and/or a process for reducing the special effect content of the multimedia information.

Figure 2:
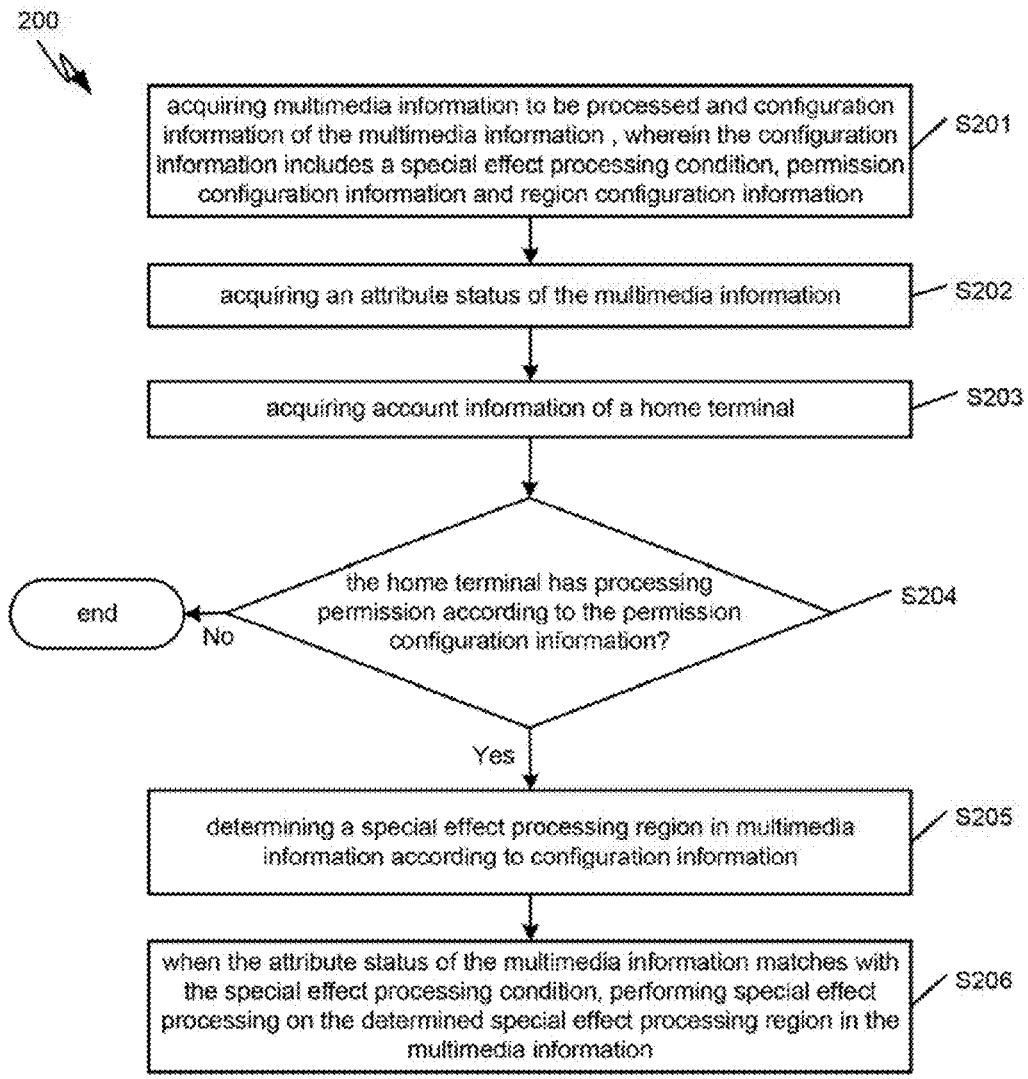
FIG. 2 is a simplified diagram showing a method for multimedia processing according to another embodiment of the present invention.

FIG. 2 is a simplified diagram showing a method for multimedia processing according to another embodiment of the present invention. The diagram is merely an example, which should not unduly limit the scope of the claims. One of ordinary skill in the art would recognize many variations, alternatives, and modifications. The method 200 includes processes S201-S206.

According to one embodiment, the process S201 includes: acquiring multimedia information to be processed and configuration information of the multimedia information. The configuration information includes: one or more special effect processing conditions, permission configuration information, region configuration information, etc. For example, the permission configuration information includes permission account information with processing permission. As an example, the region configuration information indicates a special effect processing region in the multimedia information.

According to another embodiment, the process S202 includes: acquiring an attribute status of the multimedia information. For example, the processes S201 and S202 are the same as the processes S101 and S102 as shown in FIG. 1, respectively. As an example, the process S203 includes: acquiring account information of a home terminal. As an example, the account information includes an instant messaging account, an SNS account, a mobile phone number, an email account, etc. As another example, the account information is configured to uniquely identify one device. For example, the account information of the home terminal can be configured to uniquely identify a multimedia processing device for executing the method 200.

According to yet another embodiment, the process S204 includes: detecting whether the home terminal has processing permission according to the permission configuration information. For example, if the home terminal has processing permission, the process S205 is executed. Otherwise, the method 200 is terminated. As an example, whether the account information of the home terminal (e.g., a multimedia processing device for executing the method 200) that has processing permission is detected in the permission configuration information. As another example, if the detection result is affirmative, it shows that the home terminal has processing permission, and the process S205 is executed to continue the method 200. Otherwise, it shows that the home terminal does not have processing permission and the multimedia processing flow shown in the method 200 is terminated.

In one embodiment, the process S205 includes: determining a special effect processing region in the multimedia information according to the region configuration information. For example, the region configuration information can be configured to indicate the special effect processing region in the multimedia information. As an example, a picture has a width in the range of 0-640 mm and a height in the range of 0-480 mm, and a user can set the region configuration information. For example, the region configuration information includes the width in the range of 0-24 mm and the height in the range of 0-48 mm, and the region configuration information is configured to indicate a region determined by the width in the range of 0-24 mm and the height in the range of 0-48 mm in the picture to be the special effect processing region.

In another embodiment, the process S206 includes: when the attribute status of the multimedia information matching with the special effect processing conditions, performing special effect processing on the special effect processing region in the multimedia information. For example, the process of performing special effect processing on the determined special effect processing region in the multimedia information is similar to the process S103 as shown in FIG. 1.

According to some embodiments, in addition to the special effect processing conditions, the configuration information includes one or more of the permission configuration information and the region configuration information. For example, when the configuration information includes the special effect processing conditions and the permission configuration information, the method 200 does not include the process S205, and the process S206 is the same as the process S103 as shown in FIG. 1. That is, the execution of the method 200 directly goes into the process S206 when the detection result of the process S204 is affirmative. As another example, when the configuration information includes the special effect processing conditions and the region configuration information, the method 200 does not include the processes S203-S204. That is, the execution of the method 200 directly goes into the process S205 after the process S202 is executed.

Figure 3:
FIG. 3 and FIG. 4 are simplified diagrams showing multimedia processing on pictorial information according to some embodiments of the present invention.
Figure 4:

FIG. 3 and FIG. 4 are simplified diagrams showing multimedia processing on pictorial information according to some embodiments of the present invention. The diagram is merely an example, which should not unduly limit the scope of the claims. One of ordinary skill in the art would recognize many variations, alternatives, and modifications.

As shown in FIG. 3, pictorial information and configuration information associated with the pictorial information are acquired, according to some embodiments. For example, the pictorial information includes fuzzy special effect content, and the configuration information includes one or more special effect processing conditions, permission configuration information and region configuration information. As an example, the region configuration information is configured to indicate a region of the whole picture to be a special effect processing region. As another example, the special effect processing conditions include a touch operation. In another example, the attribute status of the pictorial information is acquired. For instance, the touch operation acting on the pictorial information can be detected by calling a motion sensor.

As shown in FIG. 4, the touch operation is detected, according to some embodiments. For example, account information of a home terminal is acquired. As an example, whether the home terminal has processing permission is detected according to the permission configuration information. In another example, if the detection result is affirmative, the home terminal is determined to have processing permission. In yet another example, whether the touch operation is consistent with a particular touch operation specified by the special effect processing conditions is determined, and the pictorial information can be subject to special effect processing. In some embodiments, the special effect processing includes removing a special effect layer of the pictorial information, e.g., removing the fuzzy special effect content, and performing reduction processing on the pictorial information after the fuzzification.

Figure 5:
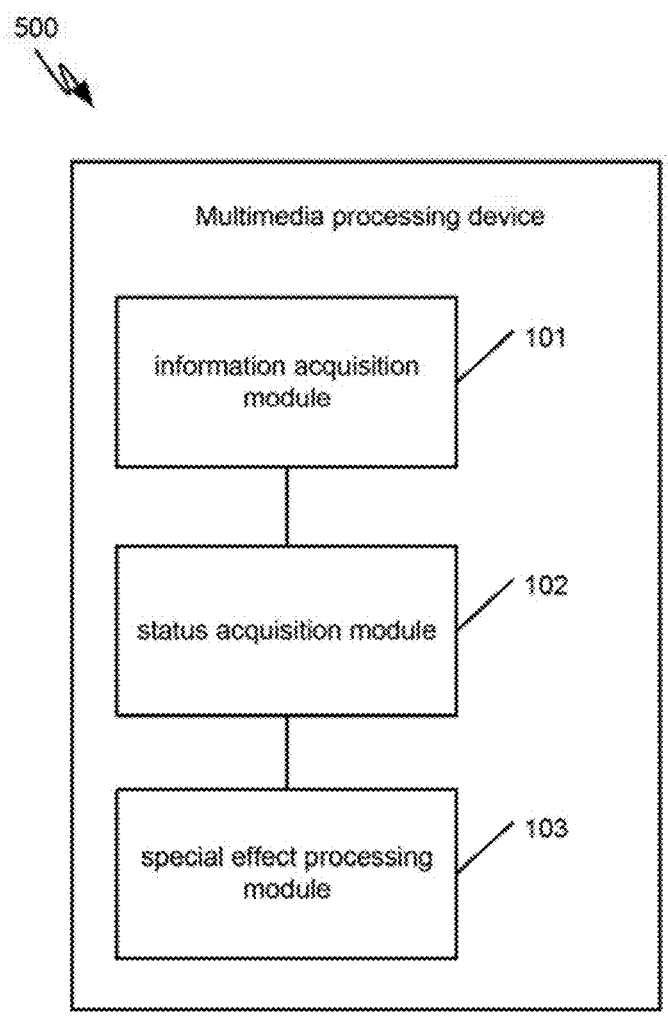
FIG. 5 is a simplified diagram showing a device for multimedia processing according to one embodiment of the present invention.

FIG. 5 is a simplified diagram showing a device for multimedia processing according to one embodiment of the present invention. The diagram is merely an example, which should not unduly limit the scope of the claims. One of ordinary skill in the art would recognize many variations, alternatives, and modifications. The device 500 includes: an information acquisition module 101, a status acquisition module 102 and a special effect processing module 103.

According to one embodiment, the information acquisition module 101 is configured to acquire multimedia information to be processed and configuration information of the multimedia information. The configuration information includes one or more special effect processing conditions.

For example, the information acquisition module 101 is configured to acquire the multimedia information to be processed and the configuration information of the multimedia information via an instant messaging application. As an example, the multimedia information to be processed and the configuration information of the multimedia information which are transmitted by instant messaging friend users are acquired via the instant messaging application. In another example, the information acquisition module 101 is configured to acquire the multimedia information to be processed and the configuration information of the multimedia information via an SNS (Social Networking Services) application. For instance, the multimedia information to be processed and the configuration information of the multimedia information which are released by SNS friend users are acquired via the SNS application. In yet another example, the information acquisition module 101 is configured to acquire the multimedia information to be processed and the configuration information of the multimedia information via a cloud server. For instance, the cloud server can store the multimedia information to be processed and the configuration information of the multimedia information, and the multimedia information to be processed and the configuration information of the multimedia information can be downloaded from the cloud server.

According to some embodiments, the multimedia information can include pictorial information, animation information and video information. In some embodiments, the multimedia information to be processed does not include special effects. That is, the multimedia information is not subjected to special effect processing. As an example, the multimedia information includes a background layer which records media content of the multimedia information. In certain embodiments, the multimedia information to be processed includes special effects. That is, the multimedia information is not subjected to special effect processing. As an example, the multimedia information includes a background layer and a special effect layer. The background layer records media content of the multimedia information and the special effect layer records special effect content of the multimedia information.

According to certain embodiments, the special effect processing conditions include: special effect processing time, a special effect processing environment, a special effect processing position, a special effect processing operation, etc. For example, the special effect processing time is represented by a time value and is also represented by a timestamp. As an example, the special effect processing environment includes: special effect processing temperature, special effect processing humidity, special effect processing light ray, etc. As another example, the special effect processing operation includes: a touch operation, a mid-air gesture operation, a radio wave control operation, etc.

According to another embodiment, the status acquisition module 102 is configured to acquire an attribute status of the multimedia information. For example, the attribute status includes: a time status, an environmental status, a position status, an operation status, etc. As an example, the special effect processing module 103 is configured to, when the attribute status of the multimedia information matching with the special effect processing conditions, perform special effect processing on the multimedia information. For example, the matching of the attribute status of the multimedia information and the special effect processing conditions can include one or more of the following: (1) the time status of the multimedia information reaches the special effect processing time. That is, the current time information reaches the special effect processing time. (2) The environmental status of the multimedia information satisfies the special effect processing environment. For example, the temperature of the environment where the multimedia information is located reaches the special effect processing temperature; the humidity of the environment where the multimedia information is located reaches the special effect processing humidity; and/or the light ray of the environment where the multimedia information is located reaches the special effect processing light ray. (3) The position status of the multimedia information is the same as the special effect processing position. That is, the current position information of the multimedia information is the same as the special effect processing position. (4) The operation status of the multimedia information is the same as the special effect processing operation. For example, a touch operation acting on the multimedia information is consistent with the touch operation specified by the special effect processing operation; a mid-air gesture operation acting on the multimedia information is consistent with the mid-air gesture operation specified by the special effect processing operation; and/or a radio wave control operation acting on the multimedia information is consistent with the radio wave control operation specified by the special effect processing operation.

Figure 6:
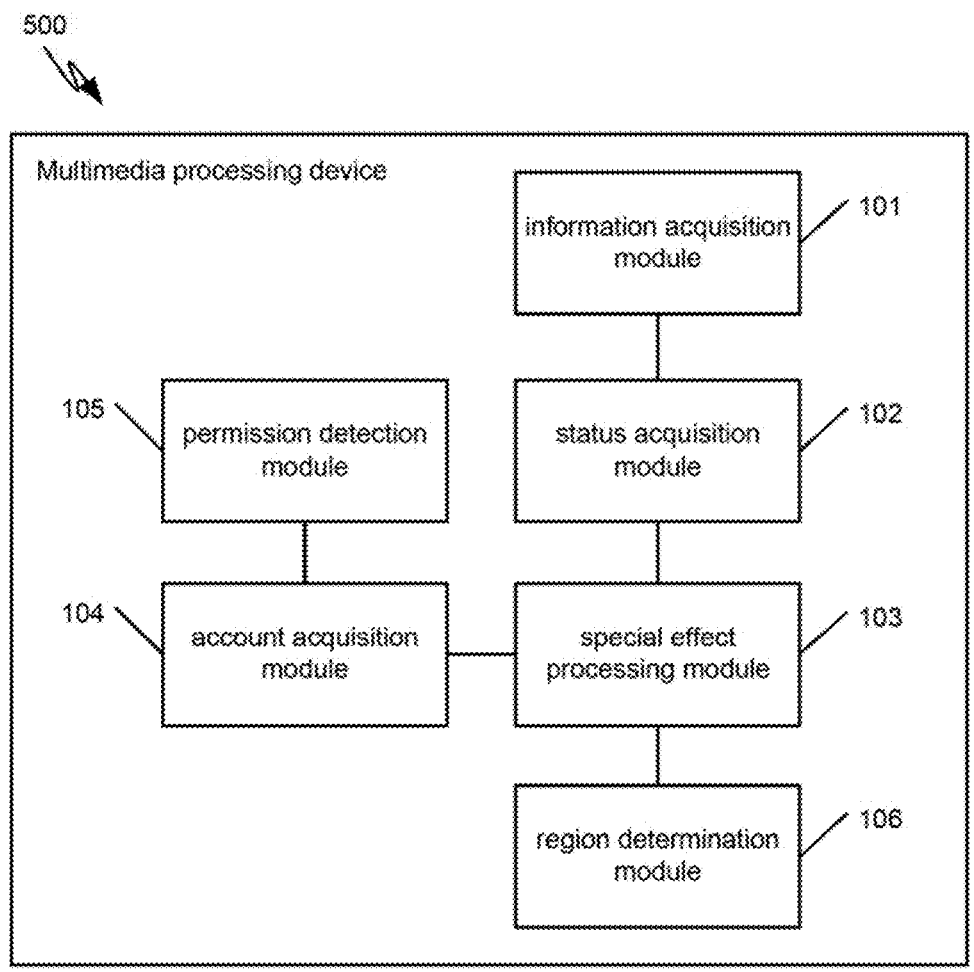
FIG. 6 is a simplified diagram showing a device for multimedia processing according to another embodiment of the present invention.

FIG. 6 is a simplified diagram showing a device for multimedia processing according to another embodiment of the present invention. The diagram is merely an example, which should not unduly limit the scope of the claims. One of ordinary skill in the art would recognize many variations, alternatives, and modifications. The device 500 further includes: an account acquisition module 104, a permission detection module 105 and a region determination module 106.

According to one embodiment, the account acquisition module 104 is configured to acquire account information of the multimedia processing device 500. As an example, the account information includes an instant messaging account, an SNS account, a mobile phone number, an email account, etc. As another example, the account information is configured to uniquely identify one device. For example, the account information of the home terminal can be configured to uniquely identify a multimedia processing device 500.

According to another embodiment, the permission detection module 105 is configured to detect whether the multimedia processing device has processing permission according to the permission configuration information. For example, if the multimedia processing device has processing permission, the permission detection module 105 informs the special effect processing module 103 to carry out special effect processing on the multimedia information when the attribute status of the multimedia information matches with the special effect processing condition.

According to yet another embodiment, the permission detection module 105 detects whether the account information of the multimedia processing device 500 has processing permission and is included in the permission configuration information. For example, if the detection result is affirmative, it shows that the multimedia processing device 500 has processing permission and the special effect processing module 103 is informed to continue multimedia processing. Otherwise, it shows that the multimedia processing device 500 does not have processing permission and the multimedia processing process is terminated.

In one embodiment, the region determination module 106 is configured to determine a special effect processing region in the multimedia information according to the region configuration information. For example, the region configuration information can be configured to indicate the special effect processing region in the multimedia information. As an example, a picture has a width in the range of 0-640 mm and a height in the range of 0-480 mm, and a user can set the region configuration information. For example, the region configuration information includes the width in the range of 0-24 mm and the height in the range of 0-48 mm, and the region configuration information is configured to indicate a region determined by the width in the range of 0-24 mm and the height in the range of 0-48 mm in the picture to be the special effect processing region.

Figure 7:
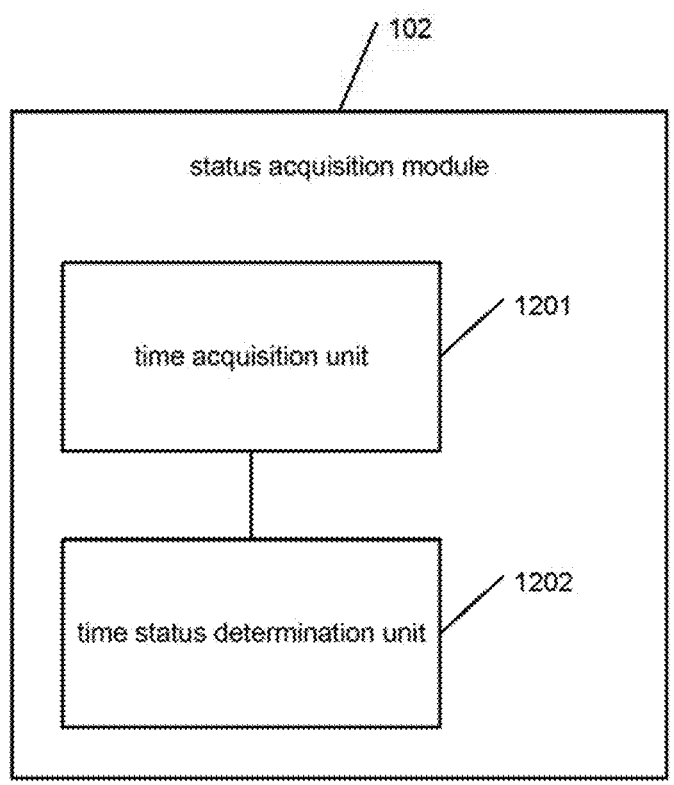
FIG. 7 is a simplified diagram showing a status acquisition module as part of the multimedia processing device as shown in FIG. 5 and/or FIG. 6 according to one embodiment of the present invention.

FIG. 7 is a simplified diagram showing a status acquisition module as part of the multimedia processing device as shown in FIG. 5 and/or FIG. 6 according to one embodiment of the present invention. The diagram is merely an example, which should not unduly limit the scope of the claims. One of ordinary skill in the art would recognize many variations, alternatives, and modifications.

According to one embodiment, the status acquisition module 102 includes a time acquisition unit 1201 and a time status determination unit 1202. For example, the time acquisition unit 1201 is configured to acquire current time information. The current time information corresponds to a time of a system associated with the multimedia information. As an example, the current time information is represented by a time value, such as 14:00:00, Feb. 4, 2013. As another example, the current time information is represented by a timestamp, such as 1359957600. As yet another example, the time status determination unit 1202 is configured to determine the current time information as the time status of the multimedia information.

Figure 8:
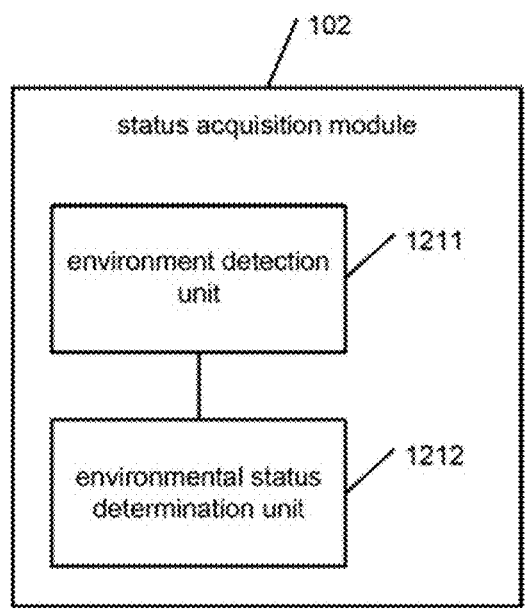
FIG. 8 is a simplified diagram showing a status acquisition module as part of the multimedia processing device as shown in FIG. 5 and/or FIG. 6 according to another embodiment of the present invention.

FIG. 8 is a simplified diagram showing a status acquisition module as part of the multimedia processing device as shown in FIG. 5 and/or FIG. 6 according to another embodiment of the present invention. The diagram is merely an example, which should not unduly limit the scope of the claims. One of ordinary skill in the art would recognize many variations, alternatives, and modifications.

According to one embodiment, the status acquisition module 102 includes an environment detection unit 1211 and an environmental status determination unit 1212. For example, the environment detection unit 1211 is configured to detect environmental information of an environment where the multimedia information is located. As an example, the current environmental information includes: temperature information, humidity information, light ray information, etc. For example, the environmental information is detected through calling an environmental sensor which includes a temperature sensor, a humidity sensor, a light ray sensor, etc. According to another embodiment, the environmental status determination unit 1212 is configured to determine the environmental information of the environment where the multimedia information is located as the environmental status of the multimedia information.

Figure 9:
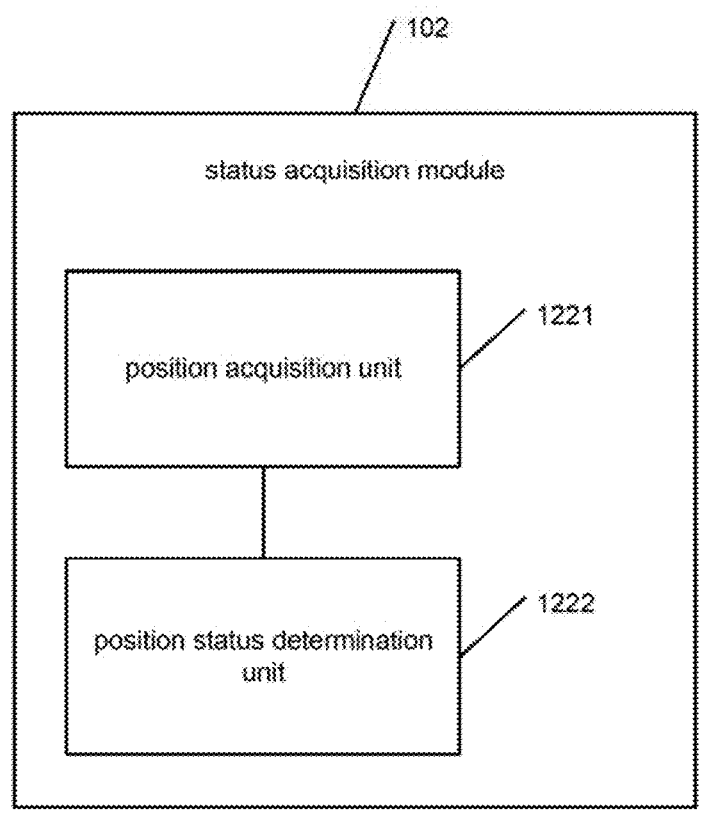
FIG. 9 is a simplified diagram showing a status acquisition module as part of the multimedia processing device as shown in FIG. 5 and/or FIG. 6 according to yet another embodiment of the present invention.

FIG. 9 is a simplified diagram showing a status acquisition module as part of the multimedia processing device as shown in FIG. 5 and/or FIG. 6 according to yet another embodiment of the present invention. The diagram is merely an example, which should not unduly limit the scope of the claims. One of ordinary skill in the art would recognize many variations, alternatives, and modifications.

According to one embodiment, the status acquisition module 102 includes a position acquisition unit 1221 and a position status determination unit 1222. For example, the position acquisition unit 1221 is configured to acquire current position information of the multimedia information. In another example, the position acquisition unit 1221 acquires the current position information of the multimedia information based on an LBS (Location Based Services) technology. As an example, the current position information is represented by longitude and latitude coordinates. As another example, LBS is provided based on geographical position information which is acquired through a wireless communication network (e.g., a GSM (Global System for Mobile communications) network and a CDMA (Code Division Multiple Access) network), or via a positioning technology such as a GPS (Global Positioning System). According to another embodiment, the position status determination unit 1222 is configured to determine the current position information of the multimedia information as the position status of the multimedia information.

Figure 10:
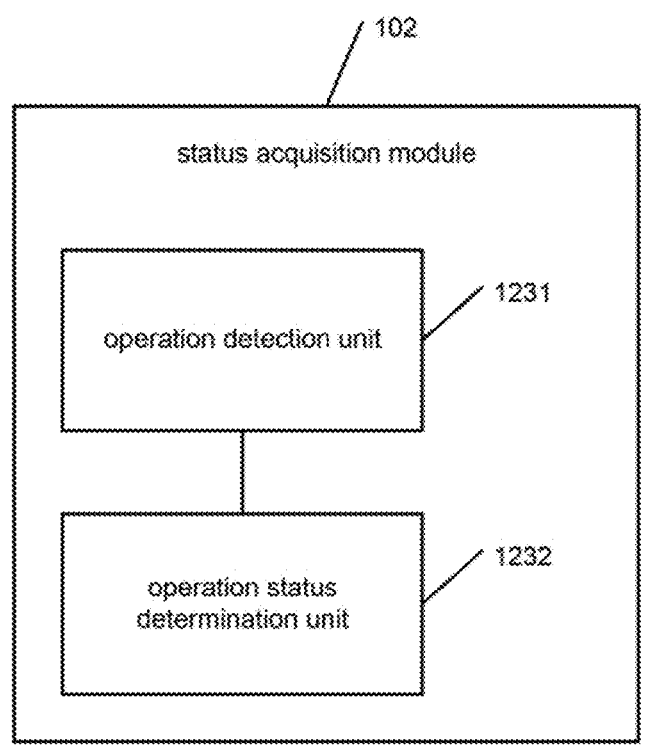
FIG. 10 is a simplified diagram showing a status acquisition module as part of the multimedia processing device as shown in FIG. 5 and/or FIG. 6 according to yet another embodiment of the present invention.

FIG. 10 is a simplified diagram showing a status acquisition module as part of the multimedia processing device as shown in FIG. 5 and/or FIG. 6 according to yet another embodiment of the present invention. The diagram is merely an example, which should not unduly limit the scope of the claims. One of ordinary skill in the art would recognize many variations, alternatives, and modifications.

According to one embodiment, the status acquisition module 102 includes an operation detection unit 1231 and an operation status determination unit 1232. For example, the operation detection unit 1231 is configured to detect operation information acting on the multimedia information. As an example, the operation information includes: a touch operation, a mid-air gesture operation, a radio wave control operation, etc. For example, the operation detection unit 1231 detects the operation information acting on the multimedia information by calling a motion sensor which includes a speed sensor, an acceleration sensor, a gyroscope, a mid-air gesture sensor, a muscle wave sensor etc. According to another embodiment, the operation status determination unit 1232 is configured to determine the operation information acting on the multimedia information as the operation status of the multimedia information.

According to some embodiments, a terminal includes a multimedia processing device (e.g., the device 500 as shown in FIG. 5-FIG. 10). For example, the terminal includes a smart device, such as a tablet personal computer, a mobile phone, a PDA (Personal Digital Assistant), an electronic reader, a laptop, a smart television, a car-mounted terminal, etc. According to certain embodiments, the multimedia process device 500 as shown in FIG. 5-FIG. 10 includes an instant messaging client, an SNS client, etc., (e.g., in a terminal), which is configured to execute the method 100 and/or the method 200.

According to one embodiment, a method is provided for multimedia processing. For example, multimedia information to be processed and configuration information of the multimedia information are acquired. The configuration information includes one or more special effect processing conditions; an attribute status of the multimedia information is acquired; and when the attribute status of the multimedia information matching with the special effect processing conditions, special effect processing is performed on the multimedia information. For example, the method is implemented according to at least FIG. 1 and/or FIG. 2.

According to another embodiment, a multimedia processing device includes: an information acquisition module configured to acquire multimedia information to be processed and configuration information of the multimedia information. The configuration information includes one or more special effect processing conditions; a status acquisition module configured to acquire an attribute status of the multimedia information; and a special effect processing module configured to when the attribute status of the multimedia information matching with the special effect processing conditions, perform special effect processing on the multimedia information. For example, the device is implemented according to at least FIG. 5 and/or FIG. 6.

According to yet another embodiment, a terminal includes a multimedia processing device that includes: an information acquisition module configured to acquire multimedia information to be processed and configuration information of the multimedia information. The configuration information includes one or more special effect processing conditions; a status acquisition module configured to acquire an attribute status of the multimedia information; and a special effect processing module configured to, when the attribute status of the multimedia information matching with the special effect processing conditions, perform special effect processing on the multimedia information. For example, the terminal is implemented according to at least FIG. 5 and/or FIG. 6.

According to yet another embodiment, a non-transitory computer readable storage medium includes programming instructions for multimedia processing. The programming instructions are configured to cause one or more data processors to execute certain operations. For example, multimedia information to be processed and configuration information of the multimedia information are acquired. The configuration information includes one or more special effect processing conditions; an attribute status of the multimedia information is acquired; and when the attribute status of the multimedia information matching with the special effect processing conditions, special effect processing is performed on the multimedia information. For example, the storage medium is implemented according to at least FIG. 1 and/or FIG. 2.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein.

For example, the disclosed methods can be implemented by a device including one or more processor, and a non-transitory computer-readable storage medium having instructions stored thereon. The instructions can be executed by the one or more processors of the device to implement the methods disclosed herein. In some cases, the instructions can include one or more modules corresponding to the disclosed methods.

The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

Figure 11:
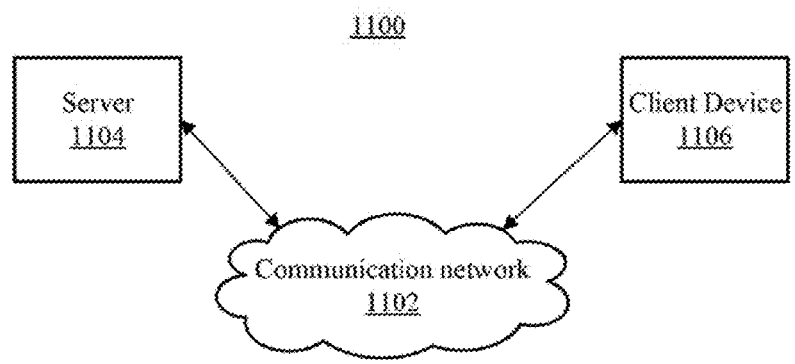
FIG. 11 depicts an exemplary environment incorporating certain disclosed embodiments.

For example, FIG. 11 depicts an exemplary environment 1100 incorporating certain disclosed embodiments. As shown in FIG. 11, environment 1100 can include a server 1104, a client device 1106 (or a terminal, a device, etc.), and a communication network 1102. The server 1104 and the client device 1106 may be coupled through the communication network 1102 for information exchange, Internet searching, data downloading, etc. Although only one client device 1106 and one server 1104 is shown in the environment 1100, any number of client devices 1106 or servers 1104 may be included, and other devices may also be included.

Communication network 1102 may include any appropriate type of communication network for providing network connections to the server 1104 and client 1106 or among multiple servers 1104 or clients 1106. For example, communication network 1102 may include the Internet or other types of computer networks or telecommunication networks, either wired or wireless.

A client device, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer to one or more server computers configured to provide certain server functionalities, such as database management and search engines. A server may also include one or more processors to execute computer programs in parallel.

Figure 12:
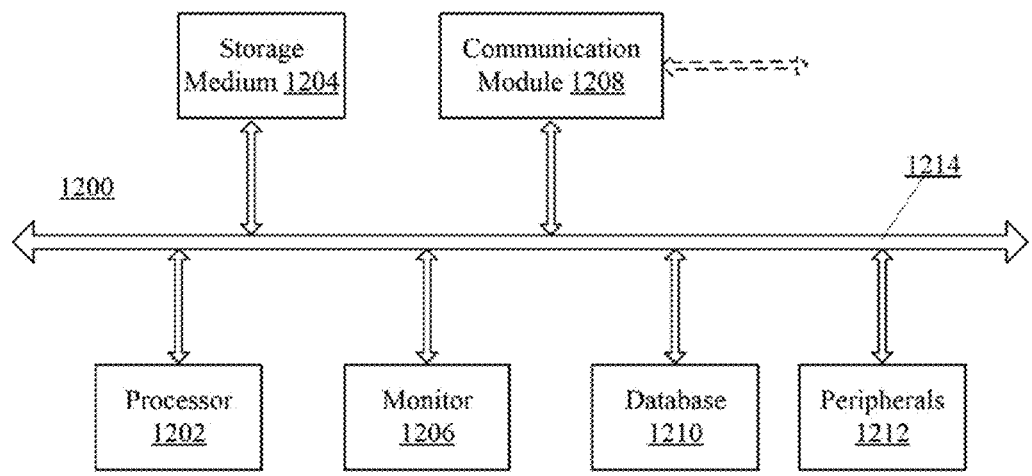
FIG. 12 depicts an exemplary computer system consistent with the disclosed embodiments.

The server 1104 and the client device 1106 may be implemented on any appropriate computing platform. FIG. 12 shows a block diagram of an exemplary computer system 1200 capable of implementing the server 1104 and/or the client device 1106. As shown in FIG. 12, the exemplary computer system 1200 may include a processor 1202, a storage medium 1204, a monitor 1206, a communication module 1208, a database 1210, peripherals 1212, and one or more bus 1214 to couple the devices together. Certain devices may be omitted and other devices may be included.

Processor 1202 can include any appropriate processor or processors. Further, processor 1202 can include multiple cores for multi-thread or parallel processing. Storage medium 1204 may include memory modules, such as ROM, RAM, and flash memory modules, and mass storages, such as CD-ROM, U-disk, removable hard disk, etc. Storage medium 1204 may store computer programs for implementing various processes, when executed by processor 1202.

Further, peripherals 1212 may include I/O devices such as keyboard and mouse, and communication module 1208 may include network devices for establishing connections through the communication network 1102. Database 1210 may include one or more databases for storing certain data and for performing certain operations on the stored data, such as webpage browsing, database searching, etc.

In operation, client device 1106 may cause server 1104 to perform certain actions, such as an Internet search or other database operations. Server 1104 may be configured to provide structures and functions for such actions and operations. More particularly, server 1104 may include a data searching system for real-time database searching.

The processor(s) 1202 can upload executable files corresponding to processes of one or more programs to the storage medium 1204, such as a non-transitory storage medium. The processor(s) 1202 can then be used to run these one or more programs stored in the storage medium 1204.

For example, the processor(s) 1202 can cause the exemplary terminal device to perform disclosed methods for multimedia processing. In the methods, multimedia information to be processed and configuration information of the multimedia information may be acquired. The configuration information includes one or more special effect processing conditions. An attribute status of the multimedia information may be acquired. When the attribute status of the multimedia information matching with the one or more special effect processing conditions, special effect processing is performed on the multimedia information.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for multimedia processing comprising:
   acquiring, by a client device, a multimedia information to be processed and a configuration information of the multimedia information, wherein the multimedia information includes a background layer and a special effect layer, the background layer comprises a media content of the multimedia information, the special effect layer comprises a special effect content of the multimedia information, and the configuration information includes one or more special effect processing conditions;
   acquiring, by the client device, an attribute status of the multimedia information; and
   when the attribute status of the multimedia information matching with the one or more special effect processing conditions, performing, by the client device, a special effect processing on the multimedia information to remove the special effect layer from the multimedia information by:
   removing the special effect content; and
   performing a reduction processing on the multimedia information.

2. The method of claim 1, wherein:
   the attribute status includes one or more of: a time status, an environmental status, a position status and an operation status;
   the special effect processing includes one or more of: fuzzification processing, fuzzification reduction processing, toning processing, tone reduction processing, liquefaction processing and liquefaction reduction processing;
   the special effect processing conditions include one or more of: special effect processing time, a special effect processing environment, a special effect processing position and a special effect processing operation;
   the special effect processing environment includes one or more of: special effect processing temperature, special effect processing humidity and special effect processing light ray; and
   the special effect processing operation includes one or more of: a touch operation, a mid-air gesture operation and a radio wave control operation.

3. The method of claim 2, wherein the acquiring an attribute status of the multimedia information includes:
   acquiring current time information; and
   determining the current time information as the time status of the multimedia information.

4. The method of claim 2, wherein the acquiring an attribute status of the multimedia information includes:
   detecting current environmental information associated with the multimedia information, wherein the current environmental information includes one or more of: temperature information, humidity information and light ray information; and
   determining the current environmental information as the environmental status of the multimedia information.

5. The method of claim 2, wherein the acquiring an attribute status of the multimedia information includes:
   acquiring current position information of the multimedia information; and
   determining the current position information of the multimedia information as the position status of the multimedia information.

6. The method of claim 2, wherein the acquiring an attribute status of the multimedia information includes:
   detecting operation information associated with the multimedia information, wherein the operation information includes one or more of: the touch operation, the mid-air gesture operation and the radio wave control operation; and
   determining the operation information associated with the multimedia information as the operation status of the multimedia information.

7. The method of claim 1, wherein:
   the configuration information further includes permission configuration information;
   the permission configuration information includes permission account information with processing permission; and
   the method further includes:
   acquiring first account information of a home terminal;
   detecting whether the home terminal has processing permission according to the permission configuration information; and
   in response to the home terminal having processing permission, performing special effect processing on the multimedia information when the attribute status of the multimedia information matches with the special effect processing conditions.

8. The method of claim 7, wherein:
   the configuration information further includes region configuration information that indicates a special effect processing region in the multimedia information;
   the method further includes: determining a first special effect processing region in the multimedia information according to the region configuration information; and
   the performing special effect processing on the multimedia information includes: when the attribute status of the multimedia information matching with the special effect processing conditions, performing special effect processing on the first special effect processing region in the multimedia information.

9. A multimedia processing device, comprising:
   a memory;
   a processor coupled to the memory, wherein the processor is configured to:
   acquire a multimedia information to be processed and a configuration information of the multimedia information, wherein the multimedia information includes a background layer and a special effect layer, the background layer comprises a media content of the multimedia information, the special effect layer comprises a special effect content of the multimedia information, and the configuration information includes one or more special effect processing conditions;

acquire an attribute status of the multimedia information; and when the attribute status of the multimedia information matching with the one or more special effect processing conditions, perform special effect processing on the multimedia information to remove the special effect layer from the multimedia information by removing the special effect content and performing a reduction processing on the multimedia information.

10. The device of claim 9, wherein:

the attribute status includes one or more of: a time status, an environmental status, a position status and an operation status;

the special effect processing includes one or more of: fuzzification processing, fuzzification reduction processing, toning processing, tone reduction processing, liquefaction processing and liquefaction reduction processing;

the special effect processing conditions include one or more of: special effect processing time, a special effect processing environment, a special effect processing position and a special effect processing operation;

the special effect processing environment includes one or more of: special effect processing temperature, special effect processing humidity and special effect processing light ray; and the special effect processing operation includes one or more of: a touch operation, a mid-air gesture operation and a radio wave control operation.

11. The device of claim 10, wherein the processor is further configured to:

acquire current time information; and determine the current time information as the time status of the multimedia information.

12. The device of claim 10, wherein the processor is further configured to:

detect current environmental information associated with the multimedia information, wherein the current environmental information includes one or more of: temperature information, humidity information and light ray information; and determine the current environmental information as the environmental status of the multimedia information.

13. The device of claim 10, wherein the processor is further configured to:

acquire current position information of the multimedia information; and determine the current position information of the multimedia information as the position status of the multimedia information.

14. The device of claim 10, wherein the processor is further configured to:

detect operation information associated with the multimedia information, wherein the operation information includes one or more of: the touch operation, the mid-air gesture operation and the radio wave control operation; and determine the operation information associated with the multimedia information as the operation status of the multimedia information.

15. The device of claim 9, wherein:

the configuration information further includes permission configuration information;

the permission configuration information includes permission account information with processing permission; and the processor is further configured to:

acquire first account information of a home terminal; and detect whether the home terminal has processing permission according to the permission configuration information and, in response to the home terminal having processing permission, perform special effect processing on the multimedia information when the attribute status of the multimedia information matches with the special effect processing conditions.

16. The device of claim 9, wherein:

the configuration information further includes region configuration information that indicates a special effect processing region in the multimedia information;

processor is further configured to: determine a first special effect processing region in the multimedia information according to the region configuration information; and when the attribute status of the multimedia information matching with the special effect processing conditions, perform special effect processing on the first special effect processing region in the multimedia information.

17. A non-transitory computer readable storage medium comprising programming instructions for multimedia processing, the programming instructions configured to cause one or more data processors to execute operations comprising:

acquiring a multimedia information to be processed and a configuration information of the multimedia information, wherein the multimedia information includes a background layer and a special effect layer, the background layer comprises a media content of the multimedia information, the special effect layer comprises a special effect content of the multimedia information, and the configuration information includes one or more special effect processing conditions;

acquiring an attribute status of the multimedia information; and when the attribute status of the multimedia information matching with the one or more special effect processing conditions, performing special effect processing on the multimedia information to remove the special effect layer from the multimedia information by removing the special effect content and performing a reduction processing on the multimedia information.

18. The non-transitory computer readable storage medium of claim 17, wherein:

the attribute status includes one or more of: a time status, an environmental status, a position status and an operation status;

the special effect processing includes one or more of: fuzzification processing, fuzzification reduction processing, toning processing, tone reduction processing, liquefaction processing and liquefaction reduction processing;

the special effect processing conditions include one or more of: special effect processing time, a special effect processing environment, a special effect processing position and a special effect processing operation;

the special effect processing environment includes one or more of: special effect processing temperature, special effect processing humidity and special effect processing light ray; and the special effect processing operation includes one or more of: a touch operation, a mid-air gesture operation and a radio wave control operation.

19. The method of claim 1, wherein the multimedia information to be processed and the configuration information of the multimedia information are acquired via an instant messaging application.

20. The method of claim 1, wherein the multimedia information to be processed and the configuration information of the multimedia information are acquired via a social networking services (SNS) application.

\* \* \* \* \*